United States Patent [19]
Haider et al.

[11] Patent Number: 6,022,444
[45] Date of Patent: *Feb. 8, 2000

[54] MODIFIED PMDI FOR FASTER PRESS TIMES OR LOWER PRESS TEMPERATURES AND REDUCTION OF MDI FROM HOT PRESSES

[75] Inventors: Karl W. Haider, New Martinsville, W. Va.; John W. Frink, Coraopolis, Pa.; Heber D. Layton, Aliquippa, Pa.; Peter H. Markusch, McMurray, Pa.; James W. Rosthauser; Bonnie L. Lawson, both of Glendale, W. Va.; Michael A. Joseph, Wheeling, W. Va.

[73] Assignee: Bayer Corporation, Pittsburgh, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/225,036

[22] Filed: Apr. 8, 1994

[51] Int. Cl.$^7$ .......................... C09J 175/04; C09J 175/08; C07C 271/28; C08G 18/50

[52] U.S. Cl. ........................... 156/331.4; 524/13; 524/14; 524/35; 528/67; 528/78; 528/85; 528/59; 528/905; 560/25; 560/26; 560/33; 560/330; 560/359; 252/182.2; 252/182.22

[58] Field of Search ..................... 525/123, 440, 525/452; 156/331.4; 528/67, 78, 85, 905; 560/25, 26, 33, 330, 359; 524/13, 14, 35; 252/182.2, 182.22

[56] References Cited

U.S. PATENT DOCUMENTS

| | | | |
|---|---|---|---|
| 4,100,328 | 7/1978 | Gallagher | 438/407 |
| 4,370,463 | 1/1983 | Schafer | 528/78 |
| 4,448,907 | 5/1984 | Schafer | 523/139 |
| 4,546,039 | 10/1985 | Horacek et al. | 428/357 |
| 4,608,407 | 8/1986 | Kerimis et al. | 524/14 |
| 4,609,513 | 9/1986 | Israel | 264/122 |
| 5,002,713 | 3/1991 | Palardy et al. | 264/109 |
| 5,070,114 | 12/1991 | Watts et al. | 521/159 |
| 5,179,143 | 1/1993 | König et al. | 524/35 |

OTHER PUBLICATIONS

James B. Wilson's—"Isocyanate Adhesives as Binders for Composition Board" which was presented at the symposium "Wood Adhesive–Research, Application and Needs" held in Madison, Wisconsin on Sep. 23–25, 1980.

*Primary Examiner*—Rabon Sergent
*Attorney, Agent, or Firm*—Joseph C. Gil; Lyndanne M. Whalen

[57] ABSTRACT

Isocyanate prepolymers which are useful as binders are made from a polyisocyanate mixture and a hydroxyl compound having at least about 1 hydroxyl group. The polyisocyanate mixture is made up of from about 50 to about 60% by weight of polyphenyl polymethylene polyisocyanate and from about 40 to about 50% by weight of an isomeric mixture of diphenylmethane diisocyanate (MDI). The isomeric mixture of MDI is made up of from about 4 to about 30% by weight of the 2,4'-isomer and from about 70 to about 96% by weight of the 4,4'-isomer. The binders of the present invention are advantageous in that they may be used in high moisture, low temperature conditions without a catalyst. Reduced MDI emissions are also achieved when the binders of the present invention are used to make composite materials.

5 Claims, No Drawings

MODIFIED PMDI FOR FASTER PRESS TIMES OR LOWER PRESS TEMPERATURES AND REDUCTION OF MDI FROM HOT PRESSES

BACKGROUND OF THE INVENTION

The present invention relates to an isocyanate-terminated prepolymer which is useful as a binder for lignocellulose-containing materials.

Composite wood products such as particle board or flake board are produced by blending a binder composition with wood flakes or other comminuted lignocellulosic materials, forming this blended composition into a mat and compressing the mat between heated platens to set the binder and bond the flakes together in densified form. Conventional manufacturing processes are generally carried out at temperatures of from about 150 to about 205° C. These processes also generally require that the moisture content of the lignocellulosic material be between 2 and 8% before it is blended with the binder.

Binder compositions which have been used in making such composite wood products include phenol formaldehyde resins, urea formaldehyde resins and isocyanates. See, for example, James B. Wilson's paper entitled, "Isocyanate Adhesives as Binders for Composition Board" which was presented at the symposium "Wood Adhesives—Research, Applications and Needs" held in Madison, Wis. on Sep. 23–25, 1980, in which the advantages and disadvantages of each of these different types of binders are discussed.

Isocyanate binders are commercially desirable because they have high adhesive and cohesive strength, flexibility in formulation, versatility with respect to cure temperature and rate, excellent structural properties, the ability to bond with lignocellulosic materials having high water contents, and no formaldehyde emissions. The disadvantages of isocyanates are difficulty in processing due to their high reactivity, adhesion to platens, lack of cold tack, high cost and the need for special storage.

Isocyanate prepolymers are among the isocyanate materials which have been used in binder compositions to solve various processing problems. U.S. Pat. No. 4,100,328, for example, discloses isocyanate-terminated prepolymers which improve product release from a mold. U.S. Pat. No. 4,609,513 also discloses a binder which is an isocyanate-terminated prepolymer to improve product release. U.S. Pat. No. 5,179,143 discloses a binder composition in which a particular type of isocyanate prepolymer is used to improve adhesiveness at room temperature.

A major processing difficulty encountered with isocyanate binders is the rapid reaction of the isocyanate with water present in the lignocellulosic material and any water present in the binder composition itself. One method used to minimize this difficulty is to use only lignocellulosic materials which have a low moisture content (i.e., a moisture content of from about 3 to about 8%). This low moisture content is generally achieved by drying the cellulosic raw material to reduce the moisture content. Such drying is, however, expensive and has a significant effect upon the economics of the process. Use of materials having low moisture contents is also disadvantageous because panels of the product composite material tend to absorb moisture and swell when used in humid environments.

One approach to resolving this problem is disclosed in U.S. Pat. No. 4,546,039. In the disclosed process for bonding lignocellulose-containing raw materials, a lignocellulosic material having a moisture content of up to 20% is coated with a prepolymer based on a diphenylmethane diisocyanate mixture. This prepolymer has a free isocyanate group content of about 15 to about 33.6% by weight and a viscosity of from 120 to 1000 mPa.s at 25° C. This prepolymer is prepared by reacting (1) about 0.05 to about 0.5 hydroxyl equivalents of a polyol having a functionality of from 2 to 8 and a molecular weight of from about 62 to about 2000 with (2) one equivalent of a polyisocyanate mixture containing (a) from 0 to about 50% by weight of polyphenyl polymethylene polyisocyanate and (b) about 50 to about 100% by weight isomer mixture of diphenlymethane diisocyanate containing 10–75% by weight of 2,4'-isomer and 25–90% by weight of 4,4'-isomer.

U.S. Pat. No. 5,002,713 discloses a method for compression molding articles from lignocellulosic materials having moisture contents of at least 15%, generally from 15 to 40%. In this method, a catalyst is applied to the lignocellulosic material, a water resistant binder is then applied to the particles and the coated particles are then compression shaped at a temperature of less than 400° F. to form the desired composite article. The catalyst used is a tertiary amine, an organometallic catalyst or a mixture thereof. The binder may be a hydrophobic isocyanate such as polymeric diphenylmethane diisocyanates, m- and p-phenylene diisocyanates, chlorophenylene diisocyanates, toluene diisocyanates, toluene triisocyanates, triphenylmethane triisocyanates, diphenylether-2,4,4'-triisocyanate and polyphenol polyisocyanates. The catalyst is included to ensure that the isocyanate/water reaction is not slowed to such an extent that the pressing time necessary to produce the molded product is significantly increased.

Pressing of wafer board, oriented strand board, and parallel strand lumber using steam injection and a conventional polymeric diphenylmethane diisocyanate (MDI) is known. Such processes yield a product having satisfactory physical properties. However, during the process, MDI is emitted from the press in the excess steam. The finished boards also emit MDI upon removal from the press.

It would be advantageous to provide an isocyanate-based binder which (1) is sufficiently water-tolerant that it may be used with lignocellulosic raw materials having moisture contents of from about 10% and higher, (2) allows shorter press times without requiring a catalyst, and (3) reduces isocyanate emissions during and subsequent to production of wood composites therefrom.

SUMMARY OF THE INVENTION

It is an object of the present invention to provide an isocyanate-based prepolymer useful as a binder for lignocellulosic materials.

It is also an object of the present invention to provide an isocyanate-based prepolymer which may be used as a binder for lignocellulosic materials having high moisture contents.

It is another object of the present invention to provide a process for producing wood composites having good physical properties in which isocyanate emissions during processing and from the composite product are significantly reduced.

It is a further object of the present invention to provide a process for producing wood composites with shorter press times than present commercial processes without a catalyst.

These and other objects which will be apparent to those skilled in the art are accomplished by mixing a lignocellulosic material with an isocyanate-based binder and then reacting and curing the binder/cellulosic material mixture at elevated temperature and pressure. The isocyanate-based binder is a low viscosity, isocyanate terminated prepolymer made from a mixture of monomeric and polymeric MDI and an isocyanate-reactive material having at least one hydroxyl group and a molecular weight of from about 62 to about 6,000.

DETAILED DESCRIPTION OF THE PRESENT INVENTION

The present invention relates to an isocyanate-terminated prepolymer having a viscosity of less than 1500 cps (preferably less than 1000 cps) at 25° C. which is useful as a binder in the production of composite materials, particularly composite materials which are based on wood. This isocyanate-terminated prepolymer is formed by reacting a polyisocyanate mixture and an isocyanate-reactive compound having from about 1 to about 8 hydroxyl groups and a molecular weight of from about 62 to about 6,000 in amounts such that the ratio of equivalents of hydroxyl groups to isocyanate groups is from about 0.001:1 to about 0.20:1, preferably from about 0.004:1 to about 0.1:1. The polyisocyanate mixture must be a mixture of polyphenylene polymethylene polyisocyanate (also known as polymeric MDI) and a mixture of diphenylmethane diisocyanate isomers.

The polyphenylene polymethylene polyisocyanate must be present in the polyisocyanate mixture in an amount of from 50 to about 60% by weight (based on the total weight of the polyisocyanate mixture), preferably from about 50 to about 58% by weight, most preferably from about 52 to about 56% by weight. The mixture of diphenylmethane diisocyanate isomers is present in an amount of from about 40 to 50% by weight (based on the total amount of polyisocyanate mixture), preferably from about 42 to about 50%. The isomer mixture of diphenylmethane diisocyanate is composed of (a) from about 4 to about 30% by weight (based on the total weight of the isomeric diphenylmethane diisocyanate mixture), preferably from about 5 to about 28% by weight of 2,4'-diphenylmethane diisocyanate and (b) from about 70 to about 96% by weight (based on the total amount of the diphenylmethane diisocyanate isomer mixture), preferably from about 72 to about 95% by weight of 4,4'-diphenylmethane diisocyanate.

The polyisocyanate mixture may be produced in accordance with any of the techniques known in the art. The isomer content of the diphenyl-methane diisocyanate may be brought within the required ranges, if necessary, by techniques which are well known in the art. One technique for changing isomer content is to add monomeric MDI to a mixture of MDI containing an amount of polymeric MDI which is higher than desired.

Polymeric isocyanates prepared from residues of the toluene diisocyanate production process may optionally be included in the binder composition of the present invention. Such residues are described, for example, in U.S. Ser. No. 08/033,935 filed Mar. 19, 1993.

The isocyanate-reactive compound which is used to produce the prepolymer of the present invention must have at least one hydroxyl group, preferably from about 2 to about 8 hydroxyl groups, and most preferably from about 2 to about 4 hydroxyl groups and a molecular weight of from about 62 to about 6000, preferably from about 500 to about 5,000, most preferably from about 1,000 to about 4000. Any of the known isocyanate-reactive materials having at least 1 hydroxyl group satisfying these criteria may be used. Suitable isocyanate-reactive materials include but are not limited to any of the known polyesters and polyethers.

Polyesters which may be used to produce the prepolymers of the present invention include the reaction products of polyhydric (preferably dihydric) alcohols with polybasic (preferably dibasic) carboxylic acids, polycarboxylic acid anhydrides or polycarboxylic acid esters of lower alcohols. The polycarboxylic acid may be aliphatic, cycloaliphatic, aromatic and/or heterocyclic and may optionally be substituted (e.g., by halogen atoms) and/or unsaturated. Specific examples of suitable carboxylic acids and their derivatives are succinic acid, glutaric acid, adipic acid, suberic acid, azelaic acid, sebacic acid, phthalic acid, isophthalic acid, terephthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid anhydride, dimerized and trimerized unsaturated fatty acids (optionally in admixture with monomeric unsaturated fatty acids such as oleic acid), terephthalic acid dimethyl ester and terephthalic acid-bis-glycol ester. Specific examples of suitable alcohols are 1,2-propylene glycol, 1,3-propylene glycol, 1,4-butylene glycol, 2,3-butylene glycol, 1,6-hexanediol, 1,8-octanediol, neopentyl glycol, 1,4-bis-hydroxy-methyl cyclohexane, 2-methyl-1,3-propanediol, glycerol, trimethylol propane, 1,2,6-hexanetriol, 1,2,4-butanetriol, trimethylol ethane, pentaerythritol, quinitol, mannitol, 1,4-cyclohexanedimethylol, sorbitol, formitol, methyl glycoside, diethylene glycol, triethylene glycol, tetraethylene glycol, higher polyethylene glycols, dipropylene glycol, higher polypropylene glycols, dibutylene glycol and higher polybutylene glycols. The polyester may contain terminal carboxyl groups or a small portion of monofunctional ester capped functionalities. Polyesters of lactones (e.g., $\epsilon$-caprolactone) or of dihydroxy carboxylic acids (e.g., $\omega$-hydroxy caproic acid) may also be used.

Preferred polyesters are prepared from mixtures of phthalic, isophthalic and terephthalic acids with ethylene glycol, diethylene glycol and higher polyethylene glycols.

Polyethers which may be used to produce the prepolymers of the present invention may be produced, for example, by polymerizing epoxides themselves in the presence of a Lewis acid catalyst or by the addition of an epoxide to starter components containing reactive hydrogen atoms such as water, alcohols, ammonia or amines. Epoxides which may be used include ethylene oxide, propylene oxide, butylene oxide, tetrahydrofuran, styrene oxide and epichlorohydrin. Ethylene oxide, propylene oxide and combinations thereof are particularly preferred.

Specific examples of suitable starter components include: ethylene glycol, 1,3-propylene glycol, 1,2-propylene glycol, trimethylol propane, glycerol, sorbitol, 4,4'-dihydroxy diphenyl propane, aniline, ethanolamine, substituted ethanolamines such as methyl ethanolamine and methyl diethanolamine, ethylene diamine, and sucrose. The starter component may be used alone or in admixture with other starter components.

Preferred polyethers are polypropylene oxide adducts started on an amine such as ammonia, ethylene diamine, and substituted ethanolamines.

The polyisocyanate mixture and isocyanate-reactive material used to produce the prepolymers of the present invention are each used in quantities such that the ratio of equivalents of hydroxyl groups to isocyanate groups is from about 0.001:1 to about 0.20:1, preferably from about 0.004 to about 0.1:1, most preferably from about 0.005 to about 0.02.

The prepolymer of the present invention may be prepared by reacting the polyisocyanate mixture and hydroxyl compound at temperatures of from about 10 to about 250° C., preferably from about 60 to about 120° C. for a period of from about 1 to about 1500 minutes, preferably from about 30 to about 200 minutes.

Other materials which may optionally be used in the production of the prepolymers of the present invention include polycarbonates, ester carbonates and ether carbonates containing isocyanate-reactive hydrogen atoms.

The prepolymers of the present invention are characterized by a viscosity of less than 1500 cps at 25° C., preferably a viscosity of less than 1000 cps at 25° C. These prepolymers also have an NCO (i.e., isocyanate group) content of from about 25 to about 32%.

Lignocellulosic materials which may be bonded with the prepolymer of the present invention include: wood, woodbark, cork, bagasse straw, flax, bamboo, esparto, rice husks, sisal fibers, coconut fibers, wood chips, wood fibers, wood shavings, wood dust, wood flour, kenaf, nut shells, hulls from cereal grains such as rice and oats. Wood, straw and bagasse are particularly preferred. These materials may be used in the form of granulates, shavings or chips, fibers, strands, spheres or powder. These materials may have a moisture content of from about 2 to about 50%, preferably from about 2 to about 20%.

In the process of the present invention, the binder is added to the lignocellulosic material to be bonded in a quantity of from about 1 to about 20% by weight, based on the total weight of binder plus lignocellulosic material, preferably from about 2 to about 10% by weight. The resultant mixture may then be compressed to form boards or three dimensional, shaped, molded articles under heat and pressure. Suitable temperatures for the compression process are generally in the range of from about 70 to about 250° C., preferably from about 130 to about 205° C. Pressures typically used in compression processes range from about 1 to about 150 bar. Compression times will, of course, be dependent upon the thickness of the product being produced. The compression times required for products made with the binders of the present invention are shorter than those required in conventional, commercial compression processes. Steam injection processes are particularly preferred when pressing articles having a thickness of 1 inch or more.

Multilayered boards or molded parts may be produced in an analogous manner from veneers, paper or woven fabrics by treating the layers with the binder as described above and subsequently pressing them, generally at elevated temperature and pressure. Temperatures of from about 100 to about 250° C. are generally preferred in such processes, with temperatures of from about 130 to about 200° C. being most preferred. The initial compression temperature is preferably in the range of from about 5 to about 150 bar, although the pressure drops towards 0 bar during the compression process in most cases.

The binder of the present invention may, of course, be used in combination with other known binders which are commonly used in the woodworking industry. When used in combination with another known binder, the binder of the present invention should generally be present in an amount of at least 10%, based on total binder, preferably in an amount of from about 25 to about 90%.

The composite wood products produced with the binder of the present invention are characterized by good appearance, good internal bond properties, good dimensional stability, excellent exterior durability and low emissions of MDI immediately after pressing.

Having thus described our invention, the following examples are given as being illustrative thereof. All parts and percentages given in these examples are parts by weight and percentages by weight, unless otherwise indicated.

EXAMPLES

The following materials were used in the following examples:

POLYISOCYANATE A

A polyisocyanate mixture made up of a) 56% by weight (based on total weight of a) plus b)) of polyphenyl polymethylene polyisocyanate and b) 44% by weight (based on total weight of a) plus b)) of an isomeric mixture of diphenylmethane diisocyanate in which the 2,4'-isomer was present in approximately 5% by weight (based on total weight of b)).

POLYISOCYANATE B

A polyisocyanate mixture made up of a) 51% by weight (based on total weight of a) plus b)) of polyphenyl polymethylene polyisocyanate and b) 49% by weight (based on total weight of a) plus b)) of an isomeric mixture of diphenylmethane diisocyanate in which the 2,4'-isomer was present as approximately 27% by weight (based on total weight of b)).

POLYOL A

An ethylene diamine initiated polyol which was epoxylated with propylene oxide having a functionality of 4 and a molecular weight of 3750.

POLYOL B

A glycerine initiated polyol epoxylated with propylene oxide and ethylene oxide (EO:PO=10:90) having a functionality of about 3 and a molecular weight of 2865.

POLYOL C

An aromatic polyester polyol having a functionality of about 2 and an OH number of from 320–360 which is commercially available from Cape Industries under the name Res D 2029.

POLYOL D

A polypropylene oxide-based polyol having a functionality of 3 and a molecular weight of 455.

POLYOL E

Tripropylene glycol.

POLYOL F

A polypropylene oxide-based polyol having a functionality of 2 and a molecular weight of 1000.

Example 1

90 parts by weight of POLYISOCYANATE A and 10 parts by weight of POLYOL A (OH/NCO equivalent ratio= 0.0156) were combined in a three-necked flask equipped with an overhead stirring unit, thermocouple and vacuum inlet. This mixture was stirred in vacuo for 3 hours at 65° C. The prepolymer was removed from the flask and stored under nitrogen in tight head containers. The product prepolymer had an NCO content of 27.8% and a viscosity of 860 cps at 23° C.

Example 2

90 parts by weight of POLYISOCYANATE B and 10 parts by weight of POLYOL A (OH/NCO equivalent ratio= 0.0156) were combined in a three-necked flask equipped with an overhead stirring unit, thermocouple and vacuum inlet. This mixture was stirred in vacuo for 3 hours at 65° C. The prepolymer was removed from the flask and stored under nitrogen in tight head containers. The product prepolymer had an NCO content of 27.8% and a viscosity of 750 cps at 23° C.

Example 3

90 parts by weight of POLYISOCYANATE A and 10 parts by weight of POLYOL B (OH/NCO equivalent ratio= 0.0312) were combined in a three-necked flask equipped with an overhead stirring unit, thermocouple and vacuum inlet. This mixture was stirred in vacuo for 3 hours at 65° C. The prepolymer was removed from the flask and stored under nitrogen in tight head containers. The product prepolymer had an NCO content of 27.5% and a viscosity of 1000 cps at 23° C.

Example 4

POLYOL D and POLYISOCYANATE A were combined in amounts such that the equivalent ratio of hydroxyl groups to isocyanate groups indicated in Table 1 were obtained. The polyol and polyisocyanate were combined in a three-necked flask equipped with an overhead stirring unit, thermocouple and vacuum inlet. This mixture was stirred in vacuo for 3 hours at 65° C. The prepolymer was removed from the flask and stored under nitrogen in tight head containers. The viscosity of each of the prepolymers prepared in this manner was determined at 25° C. and is reported in Table 1 below.

TABLE 1

| Example | equivalents OH/equivalents NCO | Viscosity |
| --- | --- | --- |
| 4a | 0.0176 | 520 cps |
| 4b | 0.0439 | 1525 cps |
| 4c* | 0.0879 | 12,500 cps |

*Comparative

Example 5

POLYOL E and POLYISOCYANATE A were combined in amounts such that the equivalent ratio of hydroxyl groups to isocyanate groups indicated in Table 2 were obtained. The polyol and polyisocyanate were combined in a three necked-flask equipped with an overhead stirring unit, thermocouple and vacuum inlet. This mixture was stirred in vacuo for 3 hours at 65° C. The prepolymer was removed from the flask and stored under nitrogen in tight head containers. The viscosity of each of the prepolymers prepared in this manner was determined at 25° C. and is reported in Table 2 below.

TABLE 2

| Example Viscosity | equivalents OH/equivalents NCO | |
| --- | --- | --- |
| 5a | 0.0417 | 660 cps |
| 5b* | 0.1042 | 3,050 cps |

*Comparative

Example 6

POLYOL F and POLYISOCYANATE A were combined in amounts such that the equivalent ratio of hydroxyl groups to isocyanate groups indicated in Table 3 were obtained. The polyol and polyisocyanate were combined in a three-necked flask equipped with an overhead stirring unit, thermocouple and vacuum inlet. This mixture was stirred in vacuo for 3 hours at 65° C. The prepolymer was removed from the flask and stored under nitrogen in tight head containers. The viscosity of each prepolymer prepared in this manner was determined at 25° C. and is reported in Table 3 below.

TABLE 3

| Example | equivalents OH/equivalents NCO | Viscosity |
| --- | --- | --- |
| 6a | 0.0267 | 655 cps |
| 6b* | 0.0533 | 2,075 cps |

*Comparative

Example 7

4 parts of POLYOL C and 96 parts of POLYISOCYANATE A were combined in a three-necked flask equipped with an overhead stirring unit, thermocouple and vacuum inlet. This mixture was stirred in vacuo for 3 hours at 65° C. The prepolymer was removed from the flask and stored under nitrogen in tight head containers. The product prepolymer had an NCO content of 29.0% and a viscosity of 650 cps at 25° C.

Example 8

Aspen strands (moisture content 5%) were coated with the prepolymer prepared in Example 1 using a spinning disk atomizer in an amount such that 5% prepolymer, based on the weight of the dry wood, was present. The binder coated furnish was formed into four 3 ft by 3 ft mats. The mats were pressed in rapid succession to 1 inch final thickness (40 lbs/ft$^3$ density) in a steam injection press with a 3 minute press cycle. Each board was then immediately placed into an enclosed styrofoam box which was lined with aluminum foil. After each of the 4 boards had been placed in the box, the air within the box was collected in measured amounts through glass fiber filters impregnated with 1-(2-pyridyl) piperazine initially and after 1.5 hours and analyzed for MDI content by high performance liquid chromatography. The amount of MDI initially present was determined to be 10.8 parts per billion. After 1.5 hours, the amount of MDI present was 1.6 parts per billion.

The properties of the finished product determined in accordance with ASTM D 1037-91 were as follows:

| | |
| --- | --- |
| Density | 40.5 lb/ft$^3$ |
| Internal Bond | 127 ± 17 psi |
| Modulus of Elasticity in Bending | 606 ± 61 kpsi |
| Modulus of Rupture in Bending | 4.83 ± 0.66 kpsi |
| Moisture Swell (24 hr soak) | 15.9 ± 3.1% |
| Weight Gain (24 hr soak) | 54 ± 5% |

Example 9 (Comparative)

The procedure of Example 8 was repeated using POLYISOCYANATE A rather than the prepolymer of Example 1. The amount of MDI initially present in the air taken from the styrofoam box 68.9 parts per billion. 10.5 parts per billion of MDI were present in the air after 1.5 hours.

The properties of the finished product determined in accordance with ASTM D 1037-91 were as follows:

| | |
| --- | --- |
| Density | 40.3 lb/ft$^3$ |
| Internal Bond | 140 ± 26 psi |
| Modulus of Elasticity in Bending | 603 ± 27 kpsi |
| Modulus of Rupture in Bending | 4.57 ± 0.45 kpsi |

| | | | | | % Thickness |
|---|---|---|---|---|---|
| | Press | | | | |
| | Time | IB[1] | MOR[2] | MOE[3] | Swell |
| Binder | (min) | (psi) | (psi) | (psi × 10) | 24 hr soak |
| Polyisocyanate A | 4 | 102 | 1150 | 270 | 10.3 |
| Polyisocyanate A | 3 | 82 | 1250 | 253 | 10.1 |
| Prepolymer of Ex. 1 | 4 | 113 | 1440 | 263 | 10.0 |
| Prepolymer of Ex. 1 | 3 | 105 | 1580 | 276 | 9.5 |

[1]IB = internal bond
[2]MOR = modulus of rupture in bending
[3]MOE = modulus of elasticity in bending

| Moisture Swell (24 hr soak) | 14.1 ± 1.5% |
|---|---|
| Weight Gain (24 hour soak) | 45 ± 2% |

The results of Examples 8 and 9 illustrate that use of the prepolymer binder of the present invention reduces MDI emissions from the hot finished boards.

Example 10

Commercial western softwood particleboard furnish was charged to a laboratory drum blender. 3% of POLYISOCYANATE A, based on the weight of dried wood, was spray applied to the furnish. This was followed by addition of 1% wax (as a 50% emulsion). Mats were hand formed in a 24 inch by 24 inch deckle box and pressed at 350° F. into 0.75 inch boards with a density of 48 pounds per cubic foot (pcf). Press times were 4, 3.75, 3.5 and 3.25 minutes from the point at which both surfaces of the mat are in contact with the platens to the point at which the press opens (i.e., daylight closed to open button). This procedure was repeated using the prepolymer prepared in Example 3 instead of POLYISOCYANATE A.

The internal bond properties of the boards were determined and are reported below. The internal bond properties of the boards prepared with the prepolymer of the present invention did not diminish with shorter press times as much as those of the boards prepared with polyisocyanate alone. This suggests that the prepolymer reacts faster under the same press conditions than the polyisocyanate alone.

Internal Bond (psi) vs Press Time

| | Press Time (min.) | | | |
|---|---|---|---|---|
| Binder | 4.0 | 3.75 | 3.5 | 3.25 |
| POLY-ISOCYANATE A | 170 psi | 144 psi | 87 psi | 96 psi |
| Prepolymer of Ex. 3 | 159 psi | 161 psi | 131 psi | 121 psi |

Example 11

Commercial Appalachian hardwood particleboard furnish was charged to a laboratory drum blender. 3% of POLYISOCYANATE A, based on the weight of oven dried wood, was spray applied to the furnish. This was followed by 1% wax (as 50% emulsion). Mats were hand formed in a 24 inch by 24 inch deckle box and pressed at 350° F. into 0.5 inch boards having a density of 42 pcf. Press times were 4 and 3 minutes (daylight closed to open button).

The above procedure was repeated using the prepolymer prepared in Example 1 instead of POLYISOCYANATE A.

The properties of the boards prepared were determined in accordance with ASTM D 1037-91 and are reported below. These results indicate that the prepolymer binder of the present invention reacts faster than a polyisocyanate alone.

Example 12

Commercial aspen strands were charged to a large drum blender in a pilot plant. Five percent binder was added by spinning disk atomizer. One percent molten slack wax was spray applied. Mats were formed on screen cauls by hand in a 3 ft by 3 ft deckle box. A screen caul was placed on top of the mats which were then steam injection pressed into 1 inch thick, 40 pcf boards. Air samples were collected inside the exhaust stack above the press while pressing four boards during a period of approximately 18–19 minutes. These air samples were analyzed for MDI content. The binders used and the monitoring results are reported in the following Table. The results show that MDI emissions in a steam press stack are reduced when the prepolymers of the present invention are used as the binder.

TABLE 4

| Binder | MDI (parts per billion) |
|---|---|
| POLYISOCYANATE A | 28 |
| Prepolymer of Ex. 7 | 22 |
| Prepolymer of Ex. 1 | 20 |
| POLYISOCYANATE B | 33 |
| Prepolymer of Ex. 2 | 25 |

Example 13

Laminated strand lumber was made using 5% of POLYISOCYANATE A or 5% of the Prepolymer from Example 7 as the binder. The wood composite was made using a steam injection process. Air samples were taken from inside the press enclosure at the top of the press and analyzed for MDI content. The results of the analysis are reported below.

| Binder | MDI (parts per billion) |
|---|---|
| POLYISOCYANATE A | 14 |
| Prepolymer from Ex. 7 | 6 |

This Example illustrates that MDI emission is reduced in a steam injection molding process when the prepolymer of the present invention is used as the binder rather than unmodified polymeric MDI.

Example 14

Commercial aspen strands were charged to a laboratory drum blender. 5% binder was spray applied. This was followed by 1% wax (as 50% emulsion). Mats were hand formed in a 24 in. by 48 in. deckle box and pressed at 350° F. into 0.75 in. boards with a density of 42 pcf. Air samples were collected inside the duct above the press during the pressing of 4 boards for a total of 25–30 minutes. These samples were analyzed for MDI content. The specific binder used and the amount of MDI measured are reported in the Table below. These results demonstrate that MDI emissions in a conventional lab press stack are reduced when the prepolymers of the present invention are used as binders.

TABLE 5

| Binder | MDI (parts per billion) |
|---|---|
| POLYISOCYANATE A | 66 |
| Prepolymer from Ex. 7 | 47 |
| Prepolymer from Ex. 1 | 14 |

Example 15

Commercial aspen strands were adjusted to moisture contents (MC's) of from approximately 5 to 10%. These strands were then charged to a large drum blender in a pilot plant. 5% binder, based on the weight of dried wood, was added by spinning disk atomizer. One percent molten slack wax was then spray applied. Mats were hand formed on screen cauls in a 3 ft by 3 ft deckle box. A screen caul was placed on top of the mats which were then steam injection pressed into 1 in. thick, 40 pcf boards. The boards were then tested for physical properties in accordance with ASTM D 1037-91. The binder used, the water content of the strand used and the physical properties of the product boards are reported in the following Table.

TABLE 6

| Binder | MC (%) | Internal Bond (psi) |
|---|---|---|
| POLYISOCYANATE A | 5 | 102 |
|  | 6 | 95 |
|  | 8 | 70 |
| Prepolymer from Ex. 1 | 5 | 82 |
|  | 8 | 90 |
|  | 9 | 80 |
| Prepolymer from Ex. 2 | 5 | 91 |
|  | 8 | 87 |
|  | 9 | 96 |
| Prepolymer from Ex. 7 | 5 | 98 |
|  | 8 | 97 |
|  | 10 | 96 |

It can be seen from these results, that the internal bond properties of boards made with the prepolymers of the present invention do not decrease as the moisture content of the lignocellulosic material is increased from 5 to 10%.

Example 16

Commercial aspen strands were adjusted to a moisture content of 15% and charged to a laboratory drum blender. 2.5% binder was spray applied to the blender contents. This was followed by the addition of 1% wax (as a 50% emulsion). Mats were hand formed in an 18 ft. by 18 ft. deckle box and pressed at 260° F. into 7/16 in. boards with a density of 38 pcf. The properties of the resultant boards were determined in accordance with ASTM D 1037-91. The binders used and the resulting properties are reported in the Table below. It can seen from this data that good strand boards may be prepared under high moisture, low temperature conditions without a catalyst when the binder compositions of the present invention are used.

TABLE 7

| Binder | Internal Bond (psi) | Modulus of Rupture (psi) | Modulus of Elasticity (psi) |
|---|---|---|---|
| POLYISOCYANATE A | 34 | 4680 | 721,000 |
| Prepolymer from Ex. 3 | 57 | 5000 | 733,000 |
| Prepolymer from Ex. 1 | 68 | 5460 | 778,000 |
| Prepolymer from Ex. 7 | 79 | 5990 | 835,000 |

Although the invention has been described in detail in the foregoing for the purpose of illustration, it is to be understood that such detail is solely for that purpose and that variations can be made therein without departing from the spirit and scope of the invention except as it may be limited by the claims.

What is claimed is:

1. A polyisocyanate prepolymer binder for lignocellulose-containing raw materials having a viscosity of less than 1500 cps at 25° C. and an NCO content of from about 25 to about 32% which requires a shorter processing time and emits less isocyanate during processing that is prepared by reacting
   a) a polyisocyanate mixture made up of
      1) from 50 to 60% by weight, based on total weight of a), of polyphenyl polymethylene polyisocyanate,
      2) from 40 to 50% by weight, based on total weight of a), of an isomer mixture of diphenylmethane diisocyanate which includes
         (i) from about 4 to about 30% by weight, based on a)2), of 2,4'-diphenylmethane diisocyanate and
         (ii) from about 70 to about 96% by weight, based on a)2), of 4,4'-diphenlymethane diisocyanate and
   b) at least one amine-initiated polyol having from 2 to 4 hydroxyl groups and a molecular weight of from about 3500 to about 4000
in amounts such that the ratio of equivalents of hydroxyl groups to equivalents of isocyanate groups is from about 0.001:1.0 to about 0.20:1.0.

2. The prepolymer of claim 1 in which component a) 2) is present as 42–46% by weight of the polyisocyanate mixture.

3. The prepolymer of claim 2 in which component a) 2) is made up of
   (i) from about 25 to about 30% by weight of 2,4'-diphenylmethane diisocyanate and
   (ii) from about 70 to about 75% by weight of 4,4'-diphenylmethane diisocyanate.

4. The prepolymer of claim 2 in which component a) 2) is made up of
   (i) from about 4–7% by weight of 2,4'-diphenylmethane diisocyanate and
   (ii) from about 93–96% by weight of 4,4'-diphenylmethane diisocyanate.

5. A process for bonding lignocellulose-containing raw materials comprising:
   A) coating the lignocellulose-containing raw material with the prepolymer of claim 1, and
   B) reacting and curing the coated lignocellulose-containing material at a temperature of from about 70 to about 250° C. and a pressure of from about 1 to about 150 bar.

* * * * *